Figure 1:
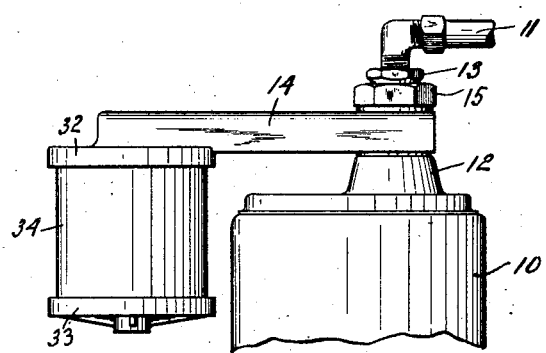

Sept. 28, 1926.

W. T. MUNRO 1,601,503

FILTER FOR GASOLINE AND THE LIKE

Filed June 4, 1926

INVENTOR
W. T. Munro
BY
Sigmund Herzog
ATTORNEY

Patented Sept. 28, 1926.

1,601,503

UNITED STATES PATENT OFFICE.

WALTER T. MUNRO, OF CRESTWOOD, NEW YORK.

FILTER FOR GASOLINE AND THE LIKE.

Application filed June 4, 1926. Serial No. 113,691.

The present invention relates to improvements in filters for gasoline and the like, for removing from gasoline and other like liquid fuels foreign matter, such as particles of dirt and water, during its passage from the supply tank to the carburetor of an internal combustion engine. The invention pertains more particularly to a filter which is interposed between the supply tank and the vacuum tank of the system.

In vacuum gasoline systems, ordinarily the vacuum tank is connected to the gasoline supply tank by a pipe, leading directly from the vacuum tank to the supply tank. If on a motor vehicle a filter is to be interposed between the supply tank and the vacuum tank, the pipe between these two elements is disconnected from the vacuum tank, the filter attached to the fuel intake of the vacuum tank and the said pipe connected with the said filter. In constructions heretofore in use, the vacuum tank and filter are usually disposed side by side, the fuel inlet of the filter being located at a substantial distance from the fuel intake of the vacuum tank. In order to make the necessary connections, it is always necessary to either discard the pipe leading from the supply tank to the vacuum tank and replace it by a longer one, or the said pipe must be made longer by attaching to it a piece of the necessary length. In either case the mounting of the filter and the making of the necessary connections necessitates the employment of a skilled mechanic.

The main object of the present invention is to so construct the filter that it may be mounted upon the vacuum tank in a convenient manner by making use of the fuel pipe already in the system, so that installation may be made by anyone with the aid of a few simple tools.

Another object of the invention is to provide a filter of the type mentioned which is simple in construction, efficient in operation and capable of manufacture on a commercial scale, or, in other words, one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

Figure 2:
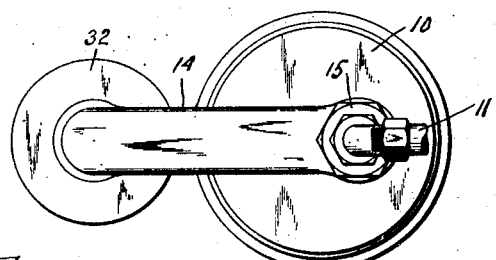

One of the many possible embodiments of the invention is illustrated in the accompanying drawings, in which:

Figure 1 is a side elevation of a portion of a vacuum tank of the well known construction, having a filter constructed in accordance with the present invention mounted thereon; Fig. 2 is a top plan view of the device shown in Fig. 1; and Fig. 3 is a central vertical section of the device shown in Fig. 1, on a larger scale.

Referring now to the drawings, the numeral 10 indicates a vacuum tank of the well known construction, the interior of which is connected to the manifold (not shown) of the internal combustion engine with which it is used by a pipe, not shown. Ordinarily the vacuum tank is connected to the gasoline supply tank by a pipe 11, leading directly from the supply tank to the vacuum tank. The vacuum tank is usually provided with an interiorly screw-threaded boss 12, with the threads of which mesh those of a fitting 13, connected to the pipe 11. In the embodiment of the invention illustrated in the drawings, an arm 14 is mounted upon the boss 12 by means of a plug 15, the said plug extending through a bore 16 in the said arm and being provided with exterior screw threads 17, meshing with those of the boss 12. Gaskets 18 and 19 are interposed between the boss and the underface of the arm and between the upper face of the said arm and the head 20 of the plug, respectively, to prevent leakage at these places. The plug is provided with bores 21 and 22, which are separated by a horizontal partition 23, the bore 21 being formed in the upper part of the plug and the bore 22 in the lower part thereof. Above the partition, the plug is provided with an exterior annular groove 24, and below the said partition with a similar groove 25, the said groove communicating with the bores 21 and 22 by passages 26 and 27, respectively. The annular groove 24 communicates also with a passageway 28 and the annular groove 25 with a passageway 29 in the arm 14. Between the annular grooves 24 and 25 is interposed a gasket 30, for the well known purpose.

The arm 14 supports a filter 31, which consists of upper and lower flanged heads 32 and 33, between which is interposed a spacing cylinder 34, preferably made of glass. The glass cylinder is positioned by the flanges 35 and 36 of the heads, and gaskets 37 are employed to provide a liquid-tight and air-tight fit between the cylinder and the heads. The heads and cylinder constitute the casing of the filter. In the construction illustrated in the drawings, the head 32 is made integral with the arm 14. A tube 38, arranged centrally within the casing, is firmly secured to the central portion of the lower head, as shown at 39. This tube communicates with the passageway 28 and is provided adjacent the lower head 33 with outlets 40. The upper end of the tube is exteriorly screw-threaded, as shown at 41, it meshing with interior screw threads of a hollow boss 42 on the head 32. Between the lower head 33 and the said boss is interposed a filtering member, comprising upper and lower disks 43 and 44, each provided with a central opening 45, through which the tube 38 extends. Each of the disks is furthermore provided with a central seat 46, into which is fitted a wire gauze cylinder 47, surrounding the tube 38. The wire gauze cylinder is of fine mesh and fits accurately in the seats of the said disks. This cylinder is of such length so as to hold the disks against the hollow boss 42 and the lower head 33. Around the wire gauze cylinder is arranged a cylinder 48 preferably of chamois. This cylinder is attached at its upper and lower ends to the edges of the disks 43 and 44 by means of rings 49, or otherwise. The filtering member forms an assembled unit, which may be easily mounted in and removed from the filter casing. In order to mount the filtering member within the casing, the lower head 33 of the filter may be turned with the tube 38 until the threaded engagement of the tube and the boss 42 is broken. Then the lower head 33, with the tube 38, may be withdrawn with the glass cylinder 34, and the filtering member may be placed on the tube 38. Thereafter the elements may be re-assembled in an obvious manner.

Figure 3:
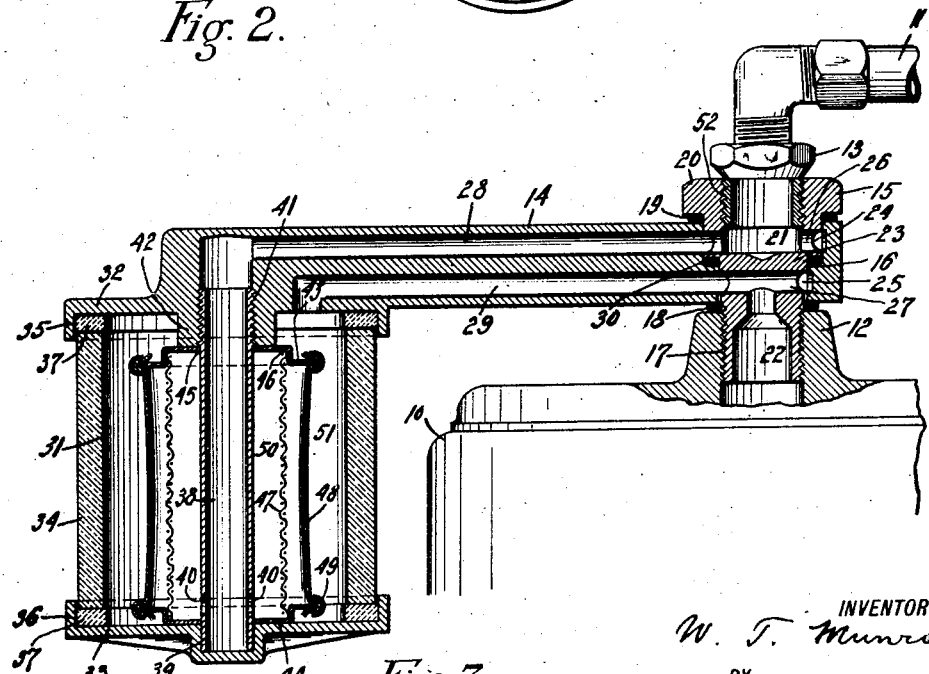

As appears from Fig. 3 of the drawings, the filtering element divides the filter casing into an inner compartment 50 and an outer compartment 51, the inner compartment communicating through the outlets 40, the tube 38 and passageway 28 with the fuel supply tube 11. The outer compartment 51 communicates through the passageway 29 with the interior of the vacuum tank, the passageway 29 terminating in the upper head 32 of the filter.

When the filter is to be applied to an already existing installation, the fitting 13 of the fuel supply pipe 11 is disconnected from the boss 12. The arm 14, carrying the assembled filter, is then placed upon the said boss and fastened thereto by the plug 15. The bore 21 of the plug is provided with interior screw threads 52, with which the threads of the fitting 13 are engaged, the device being then ready for operation. As appears from the drawings, the position of the plug 13 is relation to the boss 12 is changed only in that it is somewhat raised when the filter is mounted upon the vacuum tank. The fuel pipes on motor vehicles are always long enough to permit of such slight raising of their outer ends, so that the pipes already employed in the vacuum systems may be used without trouble.

In operation a partial vacuum is created in the vacuum tank 10 by the motor in the usual and well known manner, and this causes an inflow of gasoline from the supply tank to the vacuum tank, the gasoline flowing from the latter to the carbureter. The gasoline, before entering the vacuum tank, passes through the bore 21 in the plug, the passages 26 in said plug and through the passageway 28 in the arm 14 into the tube 38, leaving the latter through the outlets 40 and entering the compartment 50 of the filter. From this compartment the gasoline flows through the wire gauze cylinder 47 and the chamois cylinder into the compartment 51, and through the passageway 29, passages 27 and the bore 22 into the vacuum tank. The wire gauze cylinder serves to strain the gasoline, arresting the passage of particles of dirt, sand and the like, but does not arrest the passage of water or other foreign liquids. The passage of water and other foreign liquids is arrested, however, by the chamois cylinder, because, while chamois does arrest the passage of water, it does not arrest the passage of gasoline or other similar material.

When the vacuum is broken in the vacuum tank 10, liquid flows through the pipe 11 back to the supply tank, whereby a siphon action is produced in the filter 31. Due to this siphon action the filter is drained, the liquid flowing back in its entirety to the supply tank, because the outlets 40 are disposed adjacent to the bottom of the filter casing. As the liquid flows back to the supply tank its flow is reversed, the liquid passing through the chamois in the filter, through the wire gauze, through the outlets 40, tube 38 and passageway 28 to the supply tank. In doing this, the chamois and wire gauze are cleansed and the impurities returned to the supply tank. Inasmuch as the outlets 40 of the tube 38 are disposed as near as possible to the bottom of the filter, the entire contents of the said filter are drained off, whereby the entire exposed surfaces of both the chamois and the wire gauze are cleansed.

No claim is made herein to the filtering element per se, the same having been described and claimed in my copending application for Letters Patent for improvements in filters for gasoline and the like, Ser. No. 86,524, filed Feb. 6, 1926.

What I claim is:—

1. A filter for gasoline vacuum tanks, comprising an arm, one end of which is arranged to be supported directly on the vacuum tank, a closed chamber carried by said arm, a filtering element in said chamber dividing the same into a dirt-arresting compartment and a filtered-liquid compartment, said arm being provided with two passageways, one of which communicates with said dirt-arresting compartment and the other one with said filtered-liquid compartment, and a plug for removably securing said arm to said vacuum tank, said plug having two bores, one of said bores being arranged for connection with the usual gasoline supply pipe and communicating through one of said passageways with said dirt-arresting compartment and the other one of said bores establishing a communication between the other one of said passageways in said arm and said vacuum tank.

2. A filter for gasoline vacuum tanks, comprising an arm, one end of which is arranged to be supported directly on the vacuum tank, a closed chamber carried by said arm, a filtering element in said chamber dividing the same into a dirt-arresting compartment and a filtered-liquid compartment, said arm being provided with two passageways, one of which communicates with said dirt-arresting compartment and the other one with said filtered-liquid compartment, and a plug for removably securing said arm to said vacuum tank, said plug being arranged for connection with the usual gasoline supply pipe and establishing a communication between said pipe and the passageway in said arm which communicates with said dirt-arresting compartment, said plug also establishing communication between the other one of said passageways in said arm and said vacuum tank.

Signed at New York, in the county of New York, and State of New York, this 19th day of May, A. D. 1926.

WALTER T. MUNRO.